June 11, 1929. J. HEBERLING 1,716,440
BELT BUCKLE
Filed Jan. 19, 1924
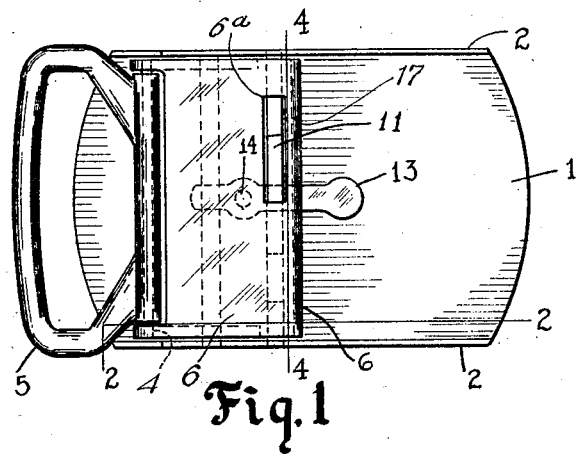
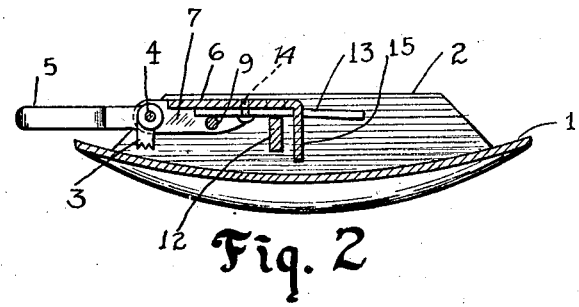
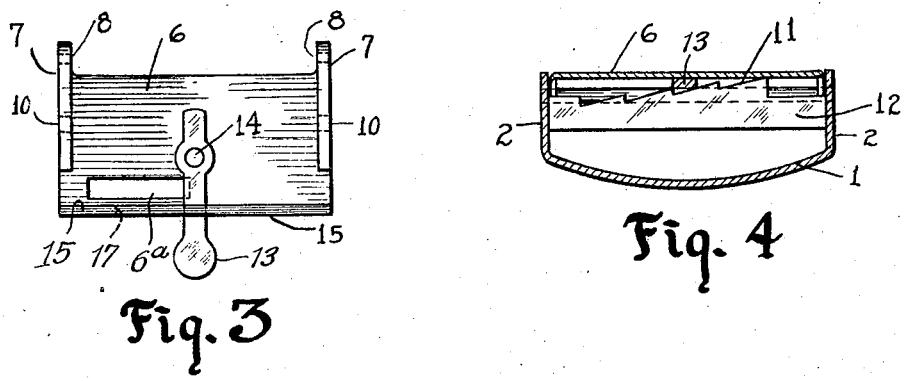
INVENTOR.
John Heberling
BY
HIS ATTORNEYS.

Patented June 11, 1929.

1,716,440

UNITED STATES PATENT OFFICE.

JOHN HEBERLING, OF ROCHESTER, NEW YORK, ASSIGNOR TO HICKOK MANUFACTURING COMPANY, INC., OF ROCHESTER, NEW YORK, A CORPORATION OF NEW YORK.

BELT BUCKLE.

Application filed January 19, 1924. Serial No. 687,263.

The present invention relates to belt buckles and more particularly to the type in which there is employed a belt body having a clamping surface thereon and a pivotally mounted clamping member arranged to cooperate with such surface, an object of this invention being to provide a novel means by which the turning axis of the clamping member may be adjustable with reference to the clamping surface on the belt body so that belts of different thicknesses may be used in connection with the buckle. A further object of the invention is to provide a construction in which manually adjustable means is employed for defining the limit of movement of the axis of turning of the clamping member toward the clamping surface on the belt body. Still another object of the invention is to mount the pivotal clamping member on a movable support or carrier and to provide in connection with the movable support or carrier an adjustable means which will limit the movement of the axis of turning of the clamping member toward the clamping surface on the belt body.

To these and other ends, the invention consists of certain parts and combinations of parts, all of which will be hereinafter described: the novel features being pointed out in the appended claims.

In the drawings:

Fig. 1 is an enlarged view of the rear face of a belt buckle constructed in accordance with this invention;

Fig. 2 is an enlarged longitudinal section on the line 2—2, Fig. 1, through the belt buckle;

Fig. 3 is a view of the inner side of the pivotal support or carrier; and

Fig. 4 is a section on the line 4—4, Fig. 1.

Referring more particularly to the drawings, 1 indicates the front plate of the buckle body which has side flanges 2 bent inwardly or laterally therefrom. The rear face of this front plate acts as a clamping surface for engagement by a clamping member 3 which is pivoted at 4 so that the engaging surface of the clamping member may move toward and from the clamping surface of the buckle body. A loop or belt anchoring member 5 connects with the clamping member 3 which controls the action of said member.

The clamping member 3 is mounted to turn on a carrier or support 6, in this instance in the form of a sheet metal plate having flanges 7, bent from opposite edges thereof and formed with bearings 8 in which the pintle of the clamping member 3 turns, the bearings being projected to one side of the plate so as to permit the free movement of the loop of the clamping member. This support 6 is movably mounted on the belt buckle frame. In this instance, a pivot pin 9 connects with the side flanges 2 and has the support or carrier 6 mounted to turn thereon, the pivot pin 9 extending through the openings 10 in the flanges 7. The turning axis of the support 6 is to one side of the axis of turning of the clamping member so that, when the support or carrier 6 turns about its axis, the axis of turning of the clamping member is moved toward and from the clamping surface formed by the rear face of the front plate 1, thus making it possible to adapt the belt buckle to belts of different thicknesses.

Means is provided for limiting the movement of the support or carrier 6 so that the limit of movement of the turning axis 4 of the clamp away from the clamping surface is defined. In this instance, the buckle body and the movable carrier support are provided with stops or abutments, one of said parts having a series of stops or abutments and the other of said parts having an adjustable stop or abutment which is manually operable. In the illustrated embodiment this series of stops 11 is formed on a bar 12 which connects the side flanges 2, whereas the adjustable stop 13 is in the form of a lever pivoted at 14 to the under side of the support or carrier 6 and extending through a slot 17 in the flange 15 at the edge of the carrier opposite the clamping member 3. This adjustable stop 13 may be swung about its axis 14 to cooperate with anyone of the stops 11 on the bar 12, such stops 11 being located at different distances from the plane of the front plate 1, so that the movement of the axis of turning 4 of the clamping member 3 away from the front plate is defined by the stops 11 engaged by the adjustable stop 13. The carrier 6 has a slot 6$^a$ therein in which the stops 11 may project so as not to interfere with the movement of the carrier 6.

From the foregoing it will be seen that there has been provided a belt buckle in which a pivotally mounted clamping member is arranged on a support or carrier manually adjustable on the buckle frame so as to vary the distance between the pivot of the clamping member for the clamping surface on the buckle frame. Cooperating stops are provided on the buckle frame and the carrier or support for the pivoted clamping member, one of said stops being manually adjustable so that the distance between the axis of the clamping member and the clamping surface on the buckle frame may be varied.

What I claim as my invention and desire to secure by Letters Patent is:

1. A belt buckle comprising a buckle frame, a clamping member, a movable support on the frame on which the clamping member is pivotally mounted, and adjusting means interposed between the support and the buckle frame and manually adjustable for controlling the position of the support on the frame in order to carry the turning axis of the clamping member toward and from the clamping surface.

2. A belt buckle comprising a buckle frame having a clamping surface, a pivotally mounted clamping member, an adjustable support on the buckle frame having the pivotally mounted clamping member mounted to turn thereon, and cooperating stops carried by the support and the frame, one of said stops being adjustable to effect the movement of the support on the frame in order to carry the turning axis of the clamping member toward and from the clamping surface.

3. A belt buckle comprising a frame having a clamping surface and side flanges, a support pivotally mounted on said side flanges, a clamping member pivotally mounted on the support, and adjusting means interposed between the frame and the support on the other side of the axis of turning of said support for effecting the movement of the support to carry the axis of turning of the clamping member toward and from the clamping surface on the frame.

4. A belt buckle comprising a frame having a clamping surface and side flanges, a support pivotally mounted on said side flanges, a clamping member pivotally mounted on the support, adjusting means interposed between the frame and the support on the other side of the axis of turning of said support for effecting the movement of the support to carry the axis of turning of the clamping member toward and from the clamping surface on the frame, said adjusting means embodying a stop bar connecting the side flanges, and a stop adjustable on the support and arranged to cooperate with different portions on said stop bar.

5. A belt buckle comprising a frame having a clamping surface and side flanges, a support pivotally mounted on said side flanges, a clamping member pivotally mounted on the support, adjusting means interposed between the frame and the support on the other side of the axis of turning of said support for effecting the movement of the support to carry the axis of turning of the clamping member toward and from the clamping surface on the frame, said adjusting means embodying a stop bar connecting the side flanges, and a stop adjustable on the support and arranged to cooperate with different portions on said stop bar, said last mentioned stop being pivotally mounted on the support.

6. A belt buckle comprising a buckle frame, a clamping member, a belt anchoring means secured to said clamping member, a movable support on the frame in which the clamping member and belt anchoring means are pivotally mounted, and adjusting means interposed between the support and the buckle frame and manually adjustable to control the position of the support on the frame in order to carry the turning axis of the clamping member toward and from the clamping surface of the buckle frame.

JOHN HEBERLING.